G. WATT.
Plow.
No. 245. A. I. Patented Aug. 2, 1859.
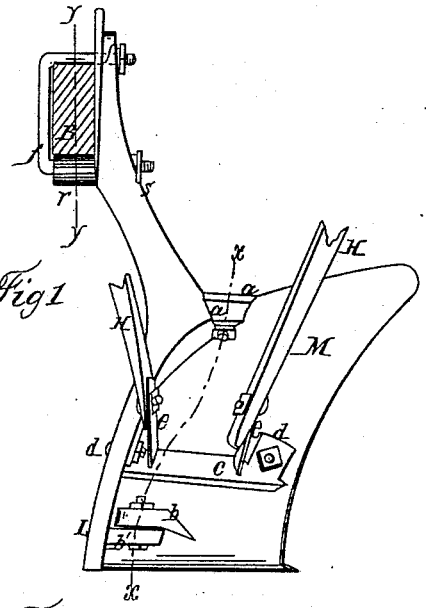
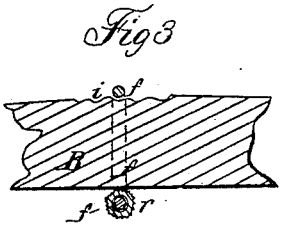
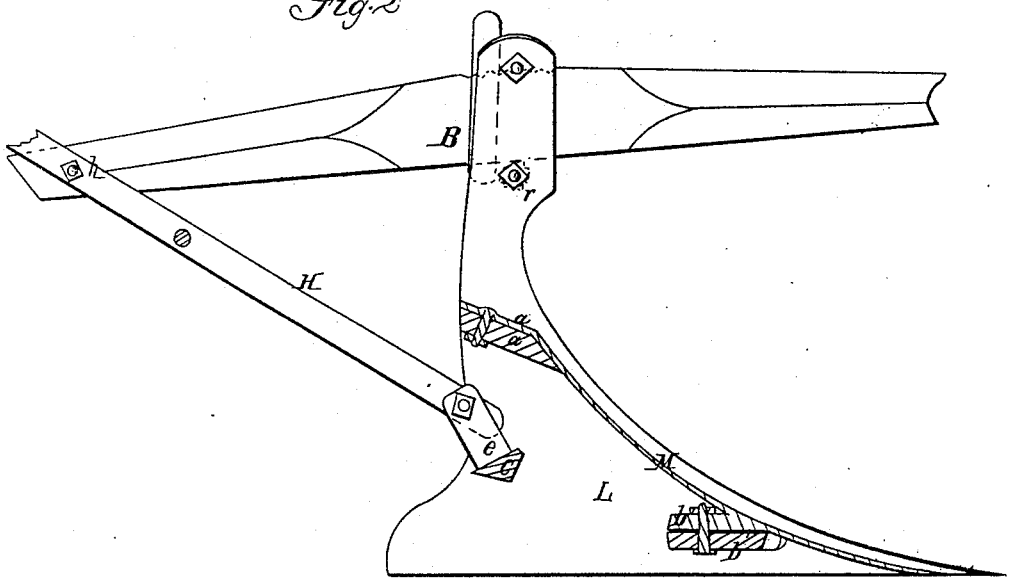
Witnesses:
Geo Patten
Jas D Clary
Inventor:
Geo Watt
N. PETERS, PHOTO-LITHOGRAPHER, WASHINGTON, D. C.

UNITED STATES PATENT OFFICE.

GEORGE WATT, OF RICHMOND, VIRGINIA.

IMPROVEMENT IN PLOWS.

Specification forming part of Additional Improvement No. 245, dated August 2, 1859, to Letters Patent No. 19,321, dated February 9, 1858.

*To all whom it may concern:*

Be it known that I, GEORGE WATT, of Richmond, in the county of Henrico and State of Virginia, have invented a new and useful Improvement in Plows, additional to my patent dated February 9, 1858; and I do hereby declare that the following is a full, clear, and exact description of the same, reference being had to the annexed drawings, forming part of this specification, in which—

Figure 1 is a rear view of my improvement. Fig. 2 is a section on line *x x*. Fig. 3 is a section on line *y y*, showing the notches on the beam and the eccentric roller.

Similar characters of reference in the several figures denote the same parts.

The nature of my invention consists in the combination of devices hereinafter set forth.

On the lower branch of the cuff attachment for forcing the beam against the upper branch thereof is an eccentric roller, whereby the lateral pressure of the cuff on the beam may be diminished, the rear of the beam being secured to the handles by a single bolt and the handles to their attachments each by a single bolt, so that the depth of plowing is graduated by adjusting the beam in the cuff, there being notches on the top of the beam for the reception of the upper branch of the cuff, or a notched plate placed thereon.

In the drawings, H is the handles, B the beam, M the mold-board, L the landside, which are secured to each other by the lapping flanges *a* and *a'*, *b* and *b'*, bolted together.

C is the brace, extending from mold-board to landside, having flanges *d*, to which the mold-board and landside are bolted, and also two arms, *e e*, to which the handles are secured by a single bolt.

S is the standard, to which is fastened the cuff *f*, through which the beam passes, having on its lower branch an eccentric roller, *r*, for forcing the beam against the upper branch thereof, thereby diminishing the lateral pressure of the cuff on the beam, and, the rear of the beam being secured to the handles by the single bolt *h* and the handles to their lower attachments, *e e*, by single bolts, the beam can be adjusted in the cuff *f*, there being notches *i i* in the top of it to receive the upper branch of the cuff, and thus regulate the depth of plowing.

I claim—

The combination of the eccentric roller *r*, beam B, notches *i*, and cuff *f*, substantially as set forth.

In testimony whereof I have hereunto signed my name before two subscribing witnesses.

GEO. WATT.

Witnesses:

GEO. PATTEN,

JOHN S. HOLLINGSHEAD.